US011517967B2

(12) United States Patent
 Kannwischer (10) Patent No.: US 11,517,967 B2
(45) Date of Patent: Dec. 6, 2022

(54) WHIRLING TOOL

(71) Applicant: Hartmetall-Werkzeugfabrik Paul Horn GmbH, Tuebingen (DE)

(72) Inventor: Markus Kannwischer, Ergenzingen (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 343 days.

(21) Appl. No.: 16/849,323

(22) Filed: Apr. 15, 2020

(65) Prior Publication Data

US 2020/0238391 A1 Jul. 30, 2020

Related U.S. Application Data

(63) Continuation of application No. PCT/EP2018/081882, filed on Nov. 20, 2018.

(30) Foreign Application Priority Data

Nov. 20, 2017 (DE) .................. 10 2017 127 307.7

(51) Int. Cl.
 *B23B 27/16* (2006.01)
 *B23B 27/10* (2006.01)
 (Continued)

(52) U.S. Cl.
 CPC .......... *B23B 27/1611* (2013.01); *B23B 27/10* (2013.01); *B23B 2220/52* (2013.01);
 (Continued)

(58) Field of Classification Search
 CPC . B23C 2210/503; B23C 2220/68; B23C 5/08; B23G 2240/60; B23G 1/34;
 (Continued)

(56) References Cited

U.S. PATENT DOCUMENTS 1,586,186 A 5/1926 Erdman
5,826,469 A 10/1998 Haradem
(Continued)

FOREIGN PATENT DOCUMENTS

CH 359007 A 12/1961
CN 1723096 A 1/2006
(Continued)

OTHER PUBLICATIONS

International Preliminary Report on Patentability for International Application No. PCT/EP2018/081882, dated Jun. 4, 2020.
(Continued)

*Primary Examiner* — Sara Addisu
(74) *Attorney, Agent, or Firm* — Jason H. Vick; Sheridan Ross, PC (57) ABSTRACT

A whirling tool configured to machine a workpiece. The whirling tool includes a plurality of cutting inserts, a cutting insert carrier, and a coolant channel which is arranged in the cutting insert carrier. The cutting insert carrier includes a plurality of cutting insert receptacles for receiving and releasably fastening respectively one of the cutting inserts. The cutting insert receptacles are arranged distributed in the circumferential direction over the cutting insert carrier. The cutting insert carrier further includes a through-opening which extends along a central axis of the cutting insert carrier, and through which the workpiece can be passed during the machining. The cutting inserts protrude into the through-opening, and the coolant channel extends between an inlet opening and an outlet opening, wherein the outlet opening leads into the through-opening and/or is oriented towards the through-opening.

32 Claims, 9 Drawing Sheets

(51) Int. Cl.
B23G 5/00 (2006.01)
B23C 5/08 (2006.01)
B23Q 11/10 (2006.01)

(52) U.S. Cl.
CPC .......... *B23C 5/08* (2013.01); *B23C 2210/503* (2013.01); *B23C 2220/68* (2013.01); *B23G 5/005* (2013.01); *B23G 2240/60* (2013.01); *B23Q 11/10* (2013.01)

(58) Field of Classification Search
CPC .. B23G 5/18; B23G 2200/10; B23G 2200/12; B23G 5/02; B23G 5/005; B23B 27/1611; B23B 27/10; B23B 2220/52; B23Q 11/10; B23Q 11/1023; B23Q 11/103
See application file for complete search history.

(56) References Cited

U.S. PATENT DOCUMENTS

| | | | |
|---|---|---|---|
| 7,094,010 B2* | 8/2006 | Jonsson | B23G 5/18 407/29 |
| 10,549,366 B2 | 2/2020 | Wagner | |
| 11,014,177 B2* | 5/2021 | Berchtold | B23C 5/28 |
| 2004/0081519 A1 | 4/2004 | Gainer | |
| 2004/0134051 A1 | 7/2004 | Glimpel et al. | |
| 2005/0220553 A1 | 10/2005 | Jonsson et al. | |
| 2012/0264528 A1 | 10/2012 | Isobe et al. | |
| 2018/0193934 A1* | 7/2018 | Wagner | B23G 1/34 |

FOREIGN PATENT DOCUMENTS

| | | | | |
|---|---|---|---|---|
| CN | 102665583 A | | 9/2012 | |
| CN | 104551271 A | | 4/2015 | |
| CN | 111451562 A | * | 7/2020 | |
| DE | 69819102 T2 | | 6/2004 | |
| DE | 102007060554 A1 | | 6/2009 | |
| DE | 102011082903 A1 | * | 3/2013 | ............. B23B 11/00 |
| DE | 102014104512 A1 | * | 10/2015 | ............. B23C 5/08 |
| DE | 102015115310 A | | 3/2017 | |
| DE | 102015115310 A1 | * | 3/2017 | ............. B23C 5/08 |
| EP | 1410864 A1 | | 4/2004 | |
| EP | 1629915 A1 | | 3/2006 | |
| EP | 1985397 A2 | | 10/2008 | |
| JP | H 07-171734 A | | 7/1995 | |
| JP | 2004-136436 A | | 5/2004 | |
| JP | 2018103355 A | * | 7/2018 | ............. B23G 1/02 |
| RU | 76267 U1 | | 9/2008 | |
| SU | 568509 A1 | | 8/1977 | |
| WO | WO-2004067216 A1 | * | 8/2004 | ............. B23G 5/18 |
| WO | WO 2017/042061 | | 3/2017 | |

OTHER PUBLICATIONS

Decision to Grant a Patent for an Invention (Including Translation) for corresponding Russian Application No. 2020113915/05(023401), dated Oct. 20, 2020.

International Search Report for International Application No. PCT/EP2018/081882, dated Mar. 11, 2019.

Written Opinion for International Application No. PCT/EP2018/081882, dated Mar. 11, 2019.

Notification of Reasons for Rejection (including Translation) for corresponding Japanese Patent Application No. 2020-52793, dated Jul. 20, 2021.

First Office Action (Including Translation) for corresponding Chinese Patent Application No. 201880074877.1, dated Jul. 22, 2022.

\* cited by examiner

WHIRLING TOOL

CROSS REFERENCE TO RELATED APPLICATIONS

This application is a continuation of international patent application PCT/EP2018/081882, filed on Nov. 20, 2018 designating the U.S., which international patent application has been published in German language and claims priority from German patent application DE 10 2017 127 307.7, filed on Nov. 20, 2017. The entire contents of these priority applications are incorporated herein by reference.

BACKGROUND OF THE INVENTION

This disclosure relates to a whirling tool for machining a workpiece.

An exemplary whirling tool is disclosed in DE 10 2015 115 310 A1.

Whirling is a metal-cutting manufacturing method which constitutes a specific form of screw milling in terms of the tool and the kinetics. Whirling serves, in particular, for producing threads but may also be generally used for producing rotationally-symmetrical parts, such as for example worms, screws or rotors.

Due to the high performance capability of this metal-cutting manufacturing method, whirling is suitable, in particular, for machining workpieces made of tough materials such as titanium or precious metal. For this reason, for example, the majority of all bone screws are produced nowadays by thread whirling.

It is characteristic of whirling that both the whirling tool and the workpiece rotate. The whirling tool which determines the cutting speed is positioned eccentrically and circulates at a high rotational speed around the slowly rotating workpiece. The feed rate of the workpiece along the longitudinal axis thereof is set according to the desired thread pitch to be produced. Additionally, the whirling tool is pivoted according to the desired thread pitch. The radial infeed of the whirling tool relative to the workpiece establishes the depth of the thread.

The eccentric positioning of the workpiece relative to the whirling tool leads to the formation of relatively short chips. This has an advantageous effect on the surface quality of the machined workpiece.

The herein presented whirling tool is suitable, in particular, for external whirling. External whirling typically serves for the production of external threads, in contrast to internal whirling which serves for the production of internal threads. In the case of external whirling, the cutting edges are oriented inwardly, wherein the cutting edges protrude into the central through-opening of the whirling tool. The whirling tool rotates around the workpiece. External whirling, therefore, is also denoted in some cases as milling with internally toothed milling cutting edges.

A basic problem which may be observed in the case of whirling tools is the relatively high degree of wear of the cutting edges used. This frequently leads to short service lives. In the case of whirling tools with replaceable cutting inserts, therefore, the cutting inserts have to be frequently replaced. This in turn leads to increased production costs.

One of the reasons for the relatively high degree of wear of the cutting inserts is, amongst other things, the coolant supply which is difficult to ensure. Due to the geometry of the whirling tools and the relatively complex movement which the whirling tools carry out during the machining of the workpiece, the supply of coolant proves difficult in comparison with many other machining tools. This is because, amongst other things, the whirling tools are generally not directly clamped in the usual tool interface of a tool machine or a changing robot on the tool machine. Due to the oblique position of the whirling tool which is required for whirling, whirling units which are specially adapted therefor are generally used, said whirling units serving as a type of adapter between the tool machine and the whirling tool.

In most whirling tools the cooling is carried out via external coolant hoses or pipes. Therefore, the cooling is located at a significant distance from the cutting point. Thus a reliable cooling of the cutting inserts and/or cutting edges is not always able to be ensured. Similarly, the direction of the coolant stream is frequently significantly limited due to the external coolant supply.

SUMMARY OF THE INVENTION

It is an object to provide a whirling tool with an optimized supply of coolant and lubricant.

According to an aspect, a whirling tool is presented which comprises:
a plurality of cutting inserts, wherein each of the cutting inserts comprises at least one cutting edge;
a cutting insert carrier that comprises a plurality of cutting insert receptacles that are each configured to receive one of the cutting inserts for releasably fastening therein, wherein the cutting insert receptacles are arranged so as to be distributed in a circumferential direction over the cutting insert carrier, wherein the cutting insert carrier comprises a through-opening which extends along a central axis of the cutting insert carrier, and through which the workpiece can be passed during the machining, wherein the cutting insert receptacles are arranged on a front face of the cutting insert carrier that runs transversely to the central axis, wherein each cutting insert receptacle comprises a supporting surface extending transversely to the central axis, wherein each of the cutting inserts bears on the respective supporting surface in a planar manner, and wherein in a mounted state of the whirling tool the cutting inserts protrude into the through-opening; and
a coolant channel which is arranged in the cutting insert carrier and which extends between an inlet opening and an outlet opening, wherein the outlet opening leads into the through-opening and/or is oriented towards the through-opening.

The whirling tool preferably comprises an internal coolant supply with a coolant channel which runs through the interior of the cutting insert carrier. Since the outlet opening of the coolant channel leads into the through-opening and/or is oriented in the direction thereof, the coolant and lubricant escapes from the coolant channel at a point which is located very close to the cutting point. Since the cutting inserts also protrude with their cutting edges into the central through-opening of the cutting insert carrier, the coolant and lubricant which escapes from the outlet opening may pass very close to the cutting edges. As a result, an optimal cooling and lubrication of the cutting edges is achieved, whereby the wear of the cutting inserts is significantly reduced. This leads to longer service lives and permits cost savings.

Due to the advantageous arrangement of the outlet opening of the coolant channel, the chips which are generated are also discharged in a targeted manner from the machining area. In addition to the improved removal of chips, improvements may also be made regarding chip breakage. This permits a higher quality of surface on the tool surfaces which are machined by means of the whirling tool.

According to a refinement, the outlet opening of the coolant channel is arranged between two adjacent cutting inserts.

This has the advantage that the intermediate space between two adjacent cutting inserts may be used in order to conduct the coolant and lubricant optimally to the machining point. Moreover, as a result, coolant and lubricant also pass both to the front face of a cutting insert and to the rear face of the adjacent cutting insert.

Although, in principle, a coolant channel with a single outlet opening may be sufficient, according to a refinement the whirling tool may comprise a plurality of these coolant channels, wherein the number of coolant channels corresponds to the number of cutting inserts and each of the coolant channels is arranged in the cutting insert carrier and extends between one respective inlet opening and one respective outlet opening, wherein each one of the outlet openings is arranged between two adjacent cutting inserts, respectively. In this manner, a uniform cooling and lubrication of each of the cutting inserts may be ensured. It goes without saying that it is also possible to provide more coolant channels than cutting inserts and that more than just one outlet opening may be arranged in each case between two cutting inserts.

For the sake of simplicity, relative to the refinements described hereinafter reference is made in each case merely to one coolant channel. It goes without saying, however, that the refinements described hereinafter may refer both to the refinement of the whirling tool with just one coolant channel and to a refinement of the whirling tool with a plurality of coolant channels.

According to a further refinement, the through-opening is defined in the radial direction by an internal wall of the cutting insert carrier, wherein the outlet opening is arranged on the internal wall.

The aforementioned internal wall defines at least one part of the through-opening. In other words it forms the external edge of the through-opening. By attaching the outlet opening to this internal wall it is possible to ensure an optimal supply of coolant and lubricant, providing in the immediate vicinity of the machining point a targeted cooling and lubrication of the chip surfaces, clearance surfaces and/or the cutting edges of the cutting inserts.

The cutting insert receptacles, in which the cutting inserts are arranged, are preferably arranged on a front face of the cutting insert carrier which runs transversely to the central axis of the cutting insert carrier. "Transversely" is understood in the present case as any orientation which is not parallel, i.e. an orientation at an angle which is not equal to 0°. "Transversely" may be understood, but does not necessarily have to be understood, as orthogonally.

According to a refinement, the inlet opening runs on a rear face of the cutting insert carrier which opposes the front face of the cutting insert carrier and which runs transversely to the central axis.

The arrangement of the inlet opening on the rear face of the cutting insert carrier permits a simple transfer of the coolant and lubricant between the tool machine and/or whirling unit and the whirling tool. The coolant and lubricant may then be passed from the inlet opening on the rear face, through the interior of the cutting insert carrier to the outlet opening of the coolant channel.

According to a further refinement, a groove running in the circumferential direction is arranged on the rear face of the cutting insert carrier, the inlet opening being arranged in said groove.

Such a circumferential groove further simplifies the transfer of coolant and lubricant between the tool machine and/or whirling unit and the whirling tool. Due to the circumferential groove, the inlet opening of the coolant channel in this case does not have to be oriented exactly aligned with a corresponding coolant transfer point on the tool machine and/or the whirling unit. The coolant and lubricant may enter the circumferential groove at any point in order to pass subsequently via the groove to the inlet opening of the coolant channel.

According to a further refinement, the inlet opening is arranged on an envelope surface of the cutting insert carrier running in the circumferential direction.

This envelope surface may be used as an alternative coolant transfer point, depending on the type of clamping of the whirling tool. This is advantageous, in particular, when the whirling tool is radially clamped in any case via this envelope surface in the whirling unit and/or the tool machine. The envelope surface running in the circumferential direction may run, but does not necessarily have to run, parallel to the central axis of the cutting insert carrier, i.e. orthogonally to the radial direction of the cutting insert carrier.

According to a further refinement, at least one part of the coolant channel is designed as a groove-shaped recess which is arranged in one of the cutting insert receptacles and is directly adjacent to one of the cutting inserts.

The coolant channel thus does not necessarily have to be designed in the shape of a bore but may also be designed as a groove or partially as a bore and partially as a groove. In a refinement as a groove-shaped recess in or adjacent to the cutting insert receptacle, preferably an external face of the adjacent cutting insert, which is arranged in the respective cutting insert receptacle, forms a part of the outlet opening. The aforementioned external face of the cutting insert preferably forms not only a part of the outlet opening but also a wall of the coolant channel. In this refinement, therefore, the coolant channel or at least a part thereof runs directly along an external face of the cutting insert. This permits coolant and lubricant to be conducted even closer and in a more targeted manner into the region of the cutting edges of the cutting inserts.

According to a further refinement, the coolant channel comprises a first rectilinear partial portion which is adjacent to the outlet opening and runs along an imaginary line which intersects or is tangential to the cutting edge, a chip surface or a clearance surface of one of the cutting inserts.

The first partial portion of the coolant channel and the outlet opening thereof are thus directly oriented toward the machining point on the workpiece. The imaginary line may coincide, but does not have to coincide, with the axis of symmetry of the first partial portion of the coolant channel. Preferably, the imaginary line runs along the longitudinal axis of the first partial portion of the coolant channel.

According to a further refinement, the coolant channel comprises a first rectilinear partial portion which is adjacent to the outlet opening and runs along an imaginary line which is located in a plane which is oriented orthogonally to the central axis of the cutting insert carrier.

The coolant and lubricant may flow in this manner parallel to the upper face of the cutting insert carrier out of the outlet opening. This provides advantages, in particular, relative to chip removal.

According to a further refinement, the coolant channel comprises a first rectilinear partial portion which is adjacent to the outlet opening and a second rectilinear partial portion which is adjacent to the inlet opening, wherein the two partial portions transition directly into one another and enclose relative to one another an angle which is not equal to 0°.

In other words, the coolant channel is designed to be angled-back. This is required, in particular, in order to guide the coolant channel in the interior of the cutting insert carrier past the cutting inserts to the desired point of the outlet opening. Instead of a curved coolant channel, an angled-back coolant channel consisting of rectilinear partial portions has advantages in terms of manufacturing technology since this channel is relatively simple to produce.

According to a further refinement, the cutting insert carrier comprises a connecting flange and a top part radially protruding from the connecting flange, wherein the inlet opening, the outlet opening and the cutting insert receptacles are arranged on the top part.

The coolant is transferred from the tool machine and/or the whirling unit to the whirling tool, therefore, preferably directly toward the top part of the whirling tool in which the cutting inserts are also arranged. Due to the radial overlap of the top part relative to the connecting flange, the coolant channel may be easily accommodated in the top part without any alterations having to be made therefor to the connecting flange.

It goes without saying that the features mentioned above and to be described in more detail hereinafter may be used not only in the respectively specified combination but also in other combinations or individually without departing from the spirit and scope of the present disclosure.

DESCRIPTION OF PREFERRED EMBODIMENTS

FIGS. 1-18 show four different exemplary embodiments of the herein presented whirling tool.

The whirling tool is denoted in FIGS. 1-18 in its entirety by the reference numeral 10.

The whirling tool 10 comprises a cutting insert carrier 12, a plurality of cutting inserts 14 being releasably fastened thereto by means of fastening elements 16. The cutting inserts 14 are preferably indexable inserts made of hard metal. The fastening screws 16 are preferably implemented as thread cutting screws which engage in corresponding threads which are provided in the cutting insert carrier 12. The thread cutting screws 16 are preferably provided with a Torx tool engagement means or a hexagonal socket tool engagement means, although in principle any types of tool engagement means are considered.

Instead of thread cutting screws 16, in principle any other types of fastening elements could also be used. For example, alternatively, one or more clamping elements may be used for clamping the cutting inserts 14. It is also not absolutely necessary that a fastening element 16 is provided for each cutting insert 14. Generally, just one fastening element could be used for all of the cutting inserts 14 together.

The cutting insert carrier 12 is preferably produced from steel. Said cutting insert carrier may either be constructed in one piece (from a single integral component) or in multiple pieces (from a plurality of components releasably connected together). The cutting insert carrier 12 comprises two bottom regions and/or portions, a top part 18 and a connecting flange 20. Both portions are connected integrally together in the exemplary embodiment of FIG. 1. The cutting inserts 14 are arranged on the top part 18. To this end, the top part 18 of the cutting insert carrier 12 comprises a plurality of cutting insert receptacles 22 for receiving one of the cutting inserts 14, respectively. The cutting insert receptacles 22 are arranged so as to be distributed in the circumferential direction on the cutting insert carrier 12. The cutting insert receptacles 22 are preferably designed as recesses, wherein the individual recesses which form the cutting insert receptacles 22 are separate from one another.

Each of the cutting insert receptacles 22 comprises a supporting surface 24, the respective cutting insert 14 bearing thereagainst in a planar manner. The supporting surfaces 24 of the different cutting insert receptacles 22 are preferably coplanar to one another. The supporting surfaces 24 of the cutting insert receptacles 22 run transversely, preferably orthogonally, to the central axis 26 of the cutting insert carrier 12.

Transversely, preferably orthogonally to the supporting surfaces 24, each cutting insert receptacle 22 also comprises a plurality of bearing surfaces 28, 30, 32a, 32b on which the cutting inserts 14 in the mounted state bear against the cutting insert carrier 12. The bearing surfaces 28, 30 are oriented at an acute angle to one another in the exemplary embodiment shown in FIGS. 1 and 2. In the exemplary embodiment shown here, the bearing surfaces 32a, 32b are also oriented in each case at an acute angle to the bearing surfaces 28, 30. The bearing surfaces 32a, 32b, however, are coplanar to one another. Instead of two partial bearing surfaces 32a, 32b, in principle a single continuous bearing surface 32 could also be provided at the same point for each cutting insert receptacle 22.

The cutting insert carrier 12 is designed to be partially hollow. The cutting insert carrier comprises in the center a through-opening 34 which extends along the central axis 26 of the cutting insert carrier 12. The through-opening 34 is preferably designed symmetrically to the central axis 26. The through-opening 34 is delimited in the radial direction of the cutting insert carrier by an internal wall 36. This internal wall 36 preferably comprises along the central axis 26 a plurality of wall portions which in the present exemplary embodiment are designed cylindrically or conically. In principle, however, other shapes (not necessarily symmetrical shapes), for example a prismatic internal wall 36, of the through-opening 34 might be considered.

In the mounted state, the cutting inserts 14 protrude, with their cutting edges 15 in use, into the through-opening 34 of the cutting insert carrier 12. During machining, the workpiece to be machined by the whirling tool 10 is inserted generally eccentrically into the through-opening 34, wherein the whirling tool 10 is rotated around the central axis 26 of the cutting insert carrier 12. During the production of a thread, the cutting insert carrier 12 is additionally pivoted relative to the workpiece by a predefined angle about an axis which runs orthogonally to the central axis 26. The pivot angle, depending on the thread pitch to be produced, is set in advance and typically not altered again during the production of the thread. Whilst the cutting insert carrier 12 rotates, the workpiece is moved in its feed direction parallel to the central axis 26.

Should the cutting edges 15 of the cutting inserts 14 become worn in use, the cutting inserts 14 may be released from the cutting insert carrier 12 and used in a different position in order to continue the machining with the next cutting edge 15. In the exemplary embodiment shown here, each cutting insert 14 comprises in each case three cutting edges 15. Thus each of the cutting inserts 14 may be turned three times and/or arranged in three different positions on the cutting insert carrier 12. It goes without saying, however, that cutting inserts with fewer than or more than three cutting edges may also be used without departing from the spirit and scope of the present disclosure.

In the exemplary embodiments shown in FIGS. 1-18, the whirling tool 10 comprises a plurality of coolant channels 38 which are arranged in the cutting insert carrier 12. In the exemplary embodiments shown here, the same quantity of coolant channels 38 and cutting inserts 14 is provided, wherein one respective coolant channel 38 is arranged between two respective adjacent cutting inserts 14. At this point it should be mentioned, however, that in principle just one of these coolant channels 38 would be sufficient without departing from the spirit and scope of the present disclosure. Each of the coolant channels 38 extends between an inlet opening 40 and an outlet opening 42, wherein each of the coolant channels 38 preferably comprises a separate inlet opening 40 and a separate outlet opening 42. It is common to all of the exemplary embodiments shown here that the outlet openings 42 in each case lead into the central through-opening 34 of the cutting insert carrier 12 and/or are oriented towards this through-opening 34. The position of the inlet openings 40 and the type of guidance of the coolant channel 38 inside the cutting insert carrier 12 in the exemplary embodiments shown here are different from exemplary embodiment to exemplary embodiment. This is described in more detail hereinafter.

Figure 1:
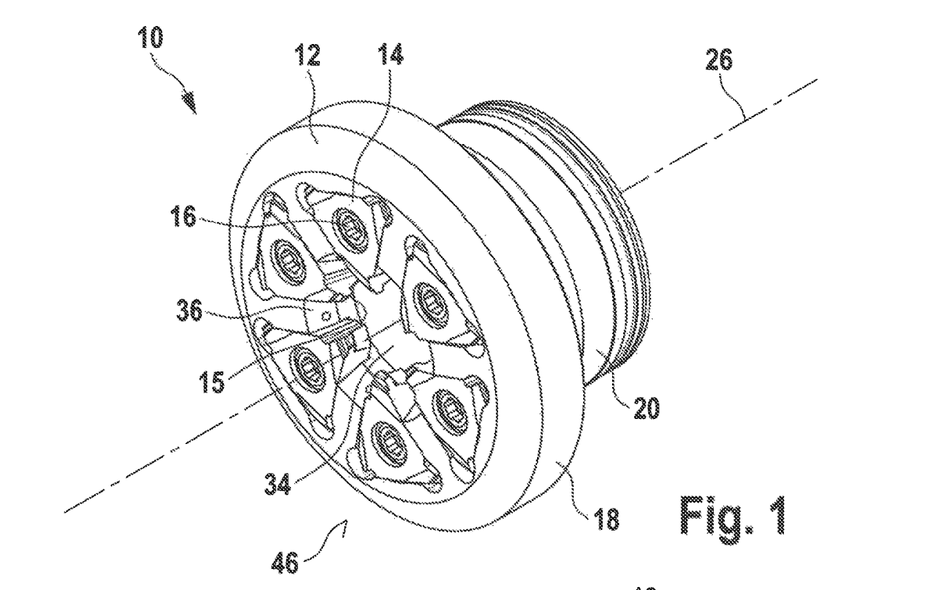
FIG. 1 shows a perspective view of a first exemplary embodiment of the whirling tool.
Figure 2:
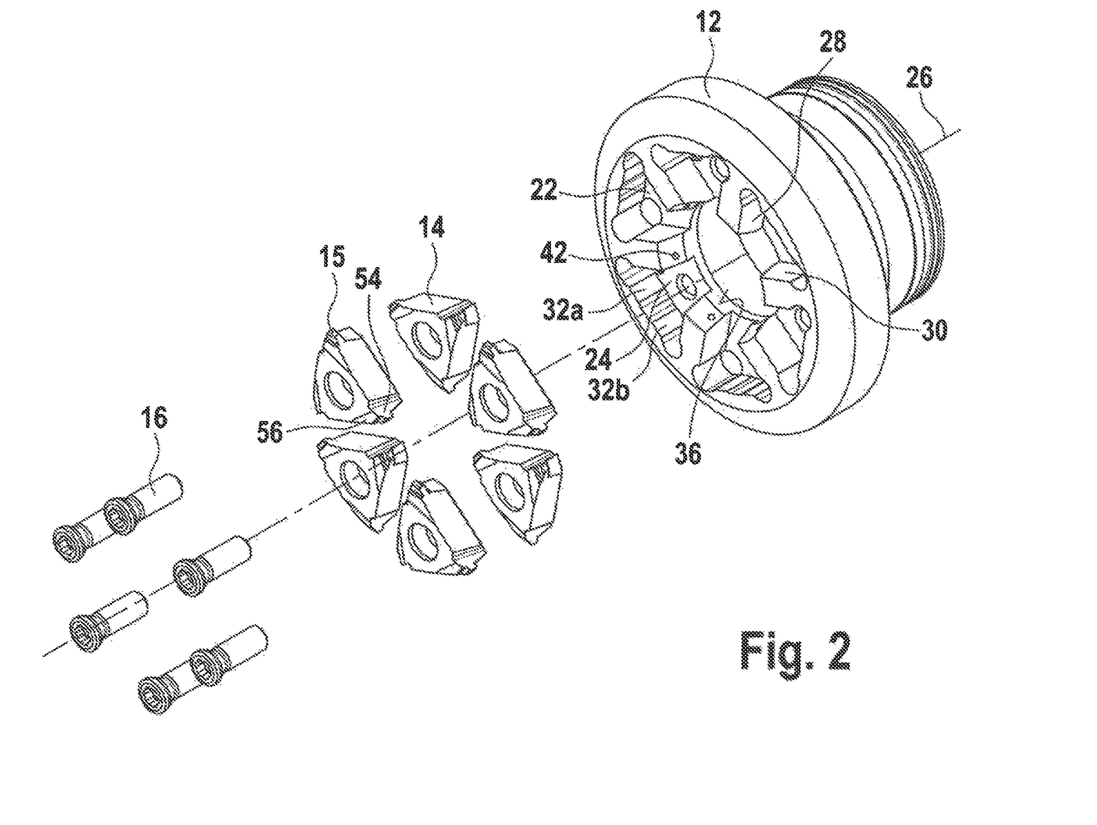
FIG. 2 shows an exploded view of the exemplary embodiment shown in FIG. 1.
Figure 3:
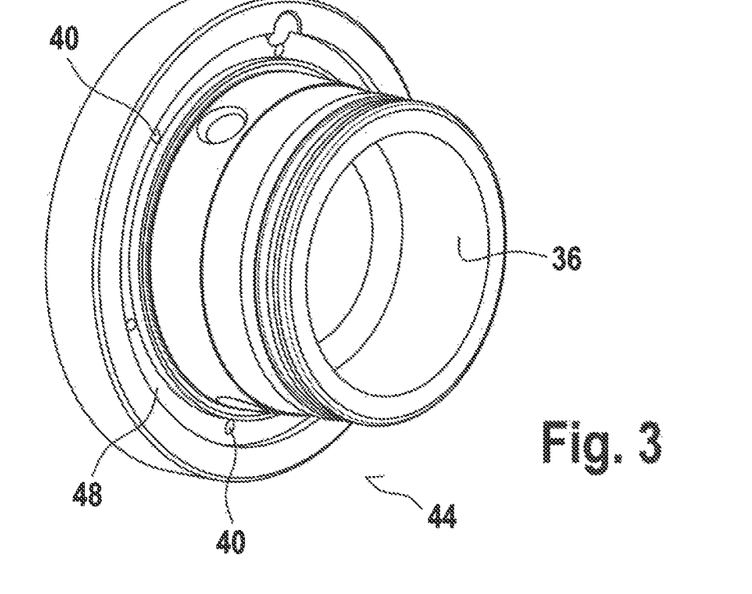
FIG. 3 shows a perspective view from the rear of the exemplary embodiment shown in FIG. 1.

In the first exemplary embodiment shown in FIGS. 1-6, the inlet openings 40 of the coolant channels 38 are arranged in each case on a rear face 44 of the cutting insert carrier (see FIG. 3). More specifically, the inlet openings 40 are arranged on the rear face 44 of the top part 18 of the cutting insert carrier 12. In the present case, the side of the cutting insert carrier 12 remote from the front face 46, which is shown in FIG. 1, is denoted as the rear face 44 of the cutting insert carrier 12. The front face 46 is the side of the cutting insert carrier 12 on which the cutting insert receptacles 22 are arranged.

Figure 4:
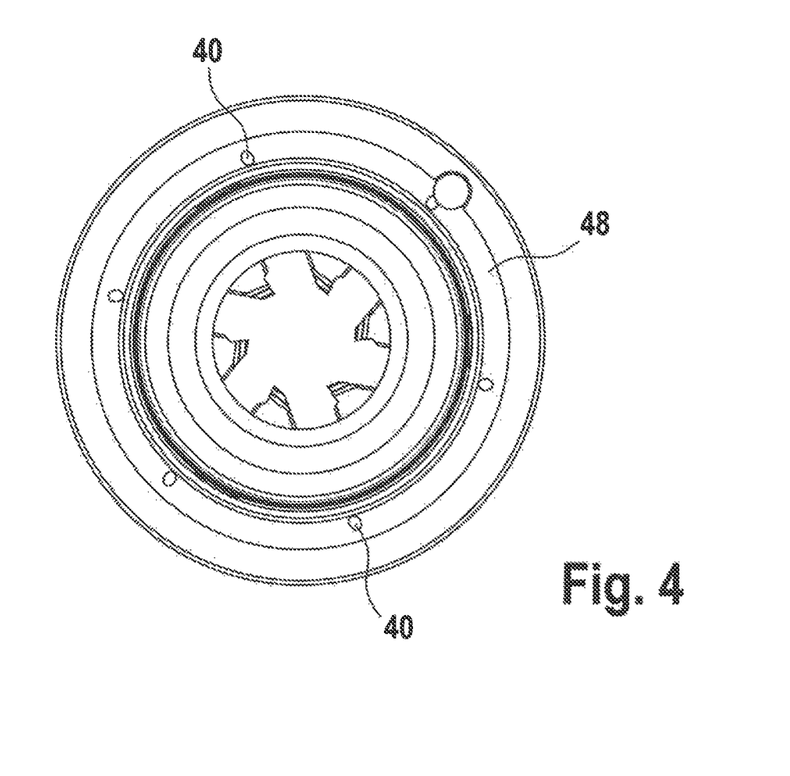
FIG. 4 shows a plan view from the rear of the exemplary embodiment shown in FIG. 1.

As is visible in particular in FIGS. 3 and 4, according to the first exemplary embodiment the inlet openings 40 are arranged in a groove 48. This groove 48 is preferably designed as a circumferential groove which runs in the circumferential direction. The advantage of this groove 48 is that the whirling tool 10 does not have to be exactly positioned in the circumferential direction relative to the tool receptacle in the tool machine in order to ensure the supply of coolant. Viewed in the circumferential direction, the coolant may enter the groove 48 at any point and then pass along the groove 48 to the individual inlet openings 40 and thus into the individual coolant channels 38. It goes without saying that to this end the groove 48 does not necessarily have to be designed to be circular. Similarly, two or more of these grooves 48 could also be provided, said grooves covering individual circular segments, so that just one or two inlet openings are arranged in each of these grooves.

According to the first exemplary embodiment the outlet openings 42 are arranged on the internal wall 36 of the through-opening 34 of the cutting insert carrier 12. Each of these outlet openings 42 is arranged between two of the cutting inserts 14 so that, when viewed in the circumferential direction, alternately a cutting insert 14, then an outlet opening 42 and then again a cutting insert 14 are always arranged on the cutting insert carrier 12.

Figures 5, 6:
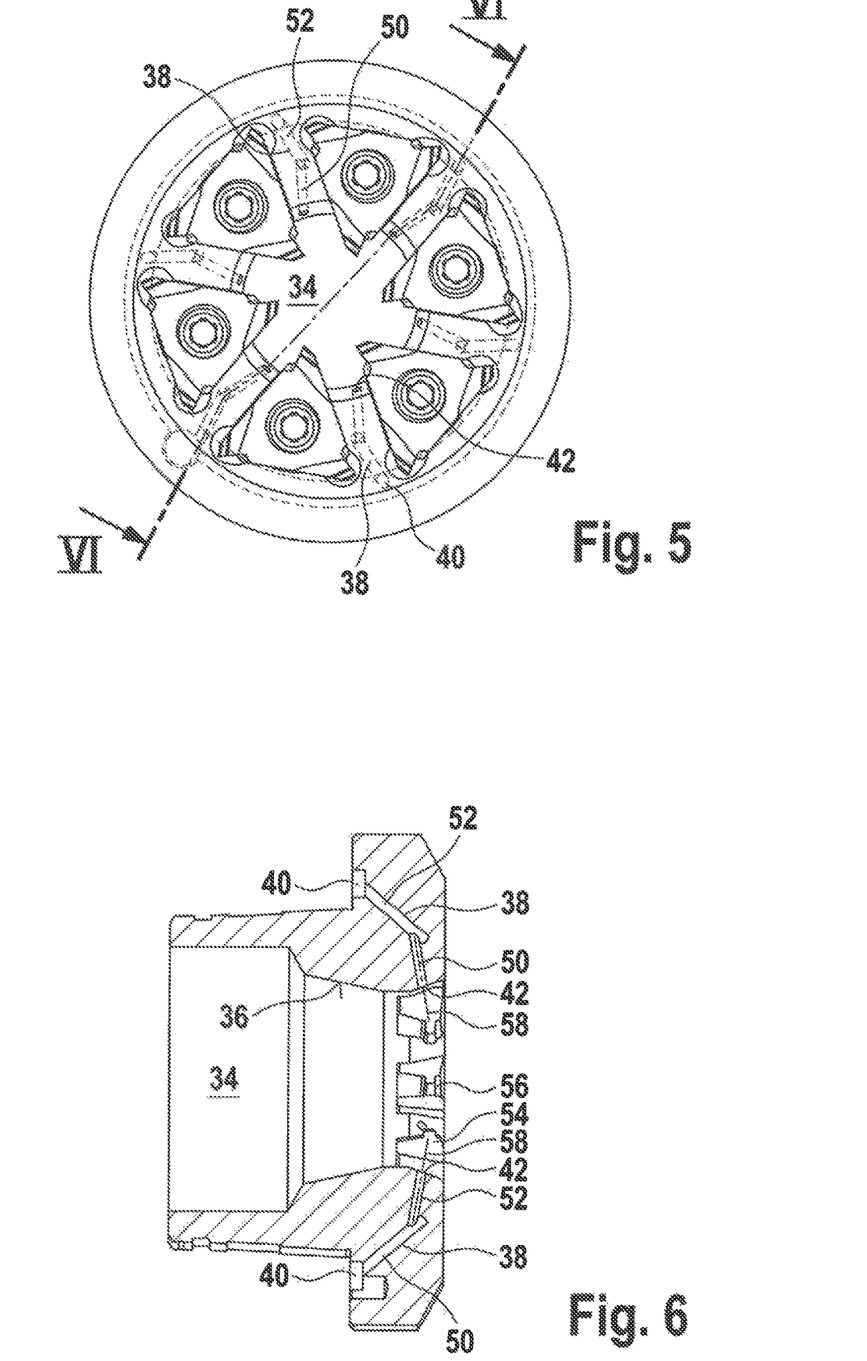
FIG. 5 shows a semi-transparent view from the front of the exemplary embodiment shown in FIG. 1.
FIG. 6 shows a sectional view indicated in FIG. 5.
Figure 7:
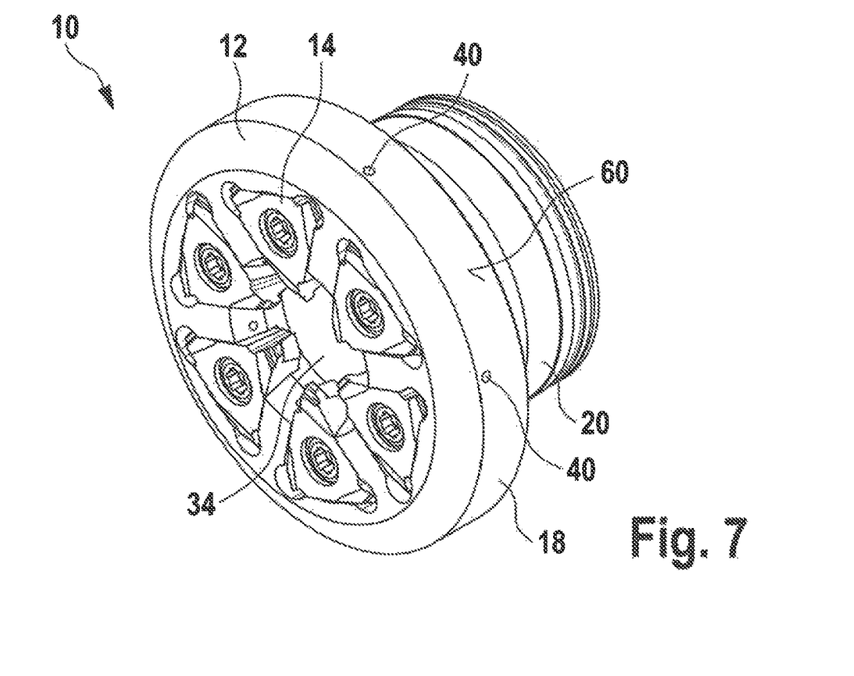
FIG. 7 shows a perspective view of a second exemplary embodiment of the whirling tool.
Figure 8:
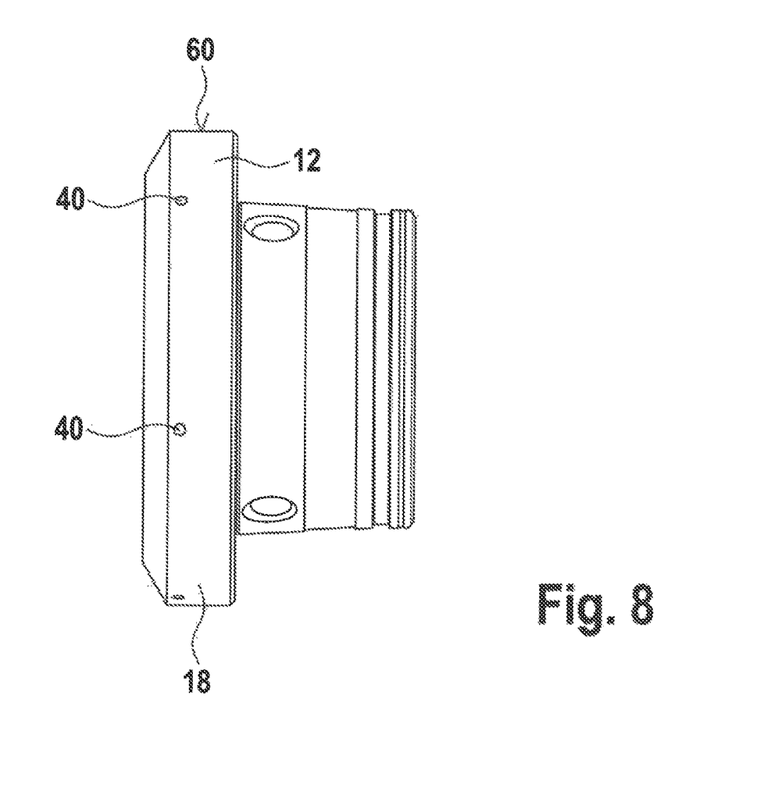
FIG. 8 shows a side view of the exemplary embodiment shown in FIG. 7.
Figure 9:
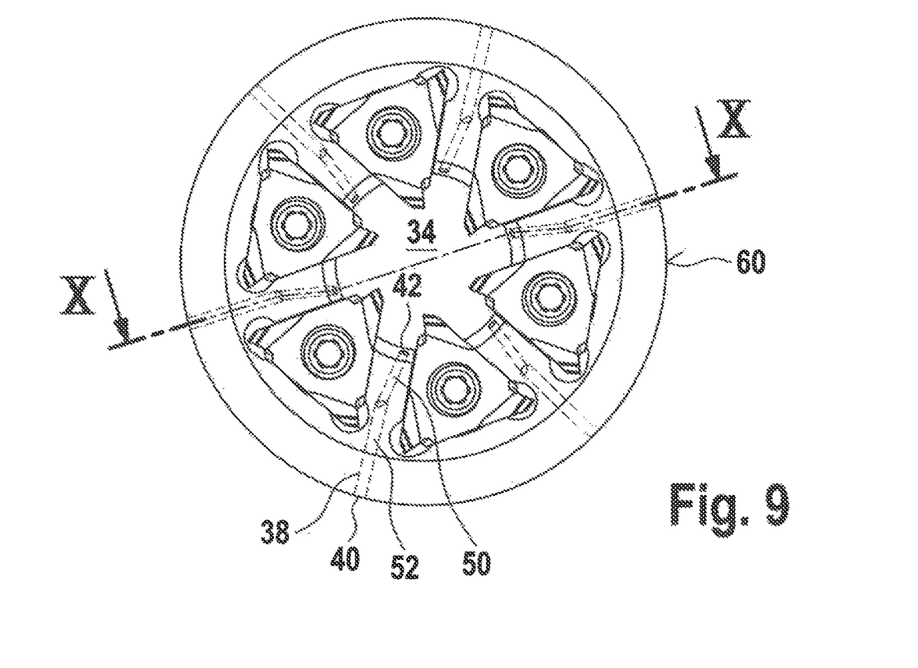
FIG. 9 shows a semi-transparent view from the front of the exemplary embodiment shown in FIG. 7.
Figure 10:
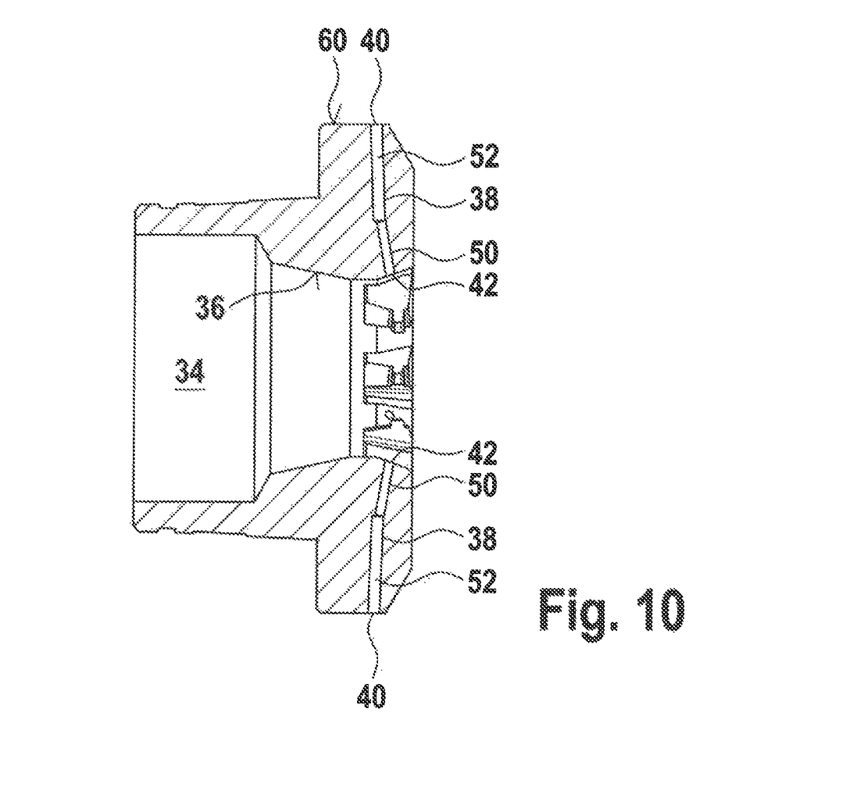
FIG. 10 shows a sectional view indicated in FIG. 9.
Figure 11:
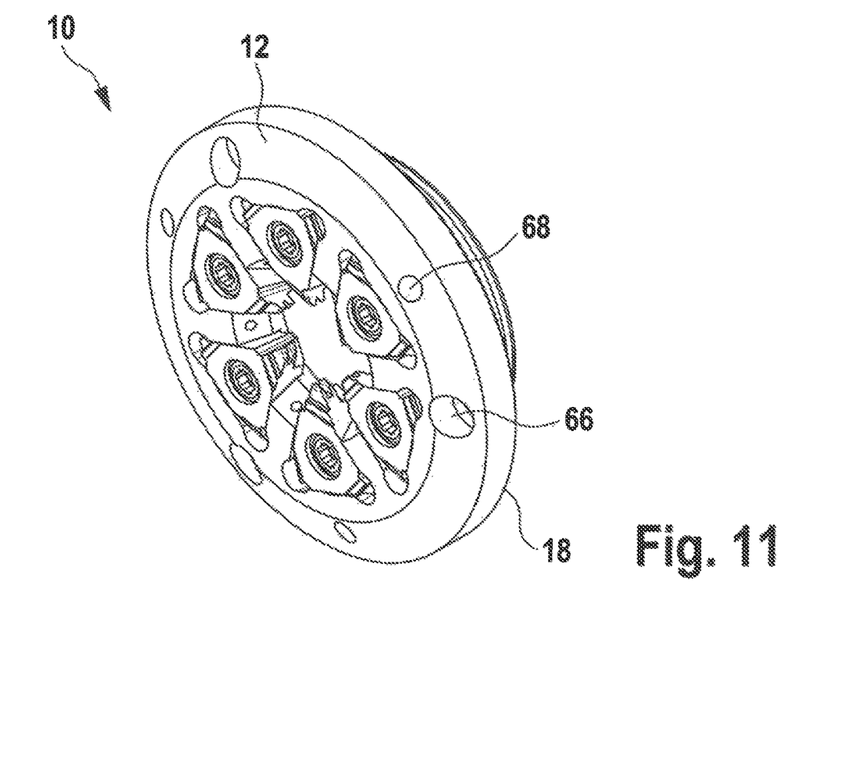
FIG. 11 shows a perspective view of a third exemplary embodiment of the whirling tool.
Figure 12:
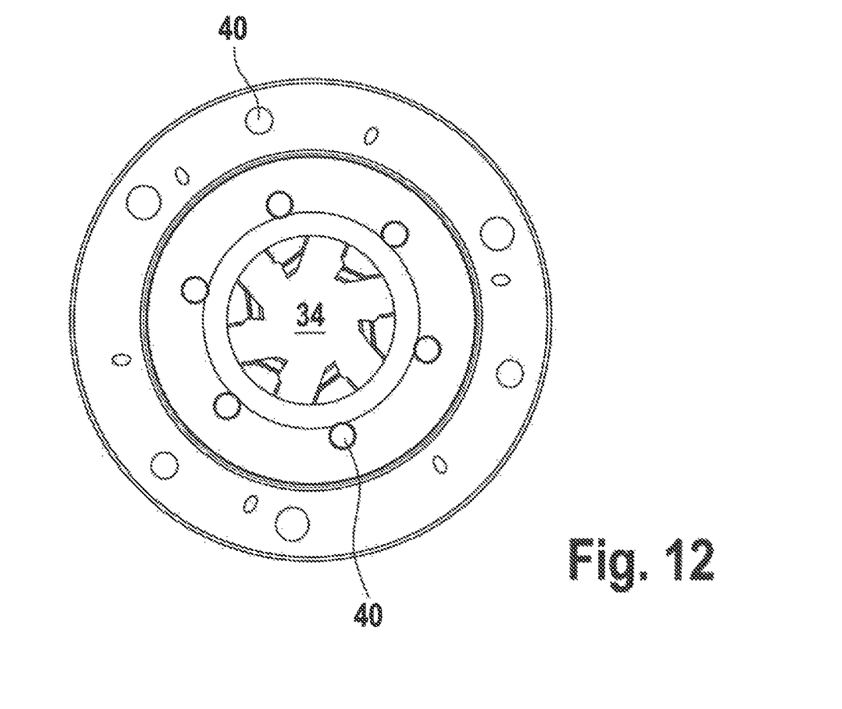
FIG. 12 shows a plan view from the rear of the exemplary embodiment shown in FIG. 11.
Figure 13:
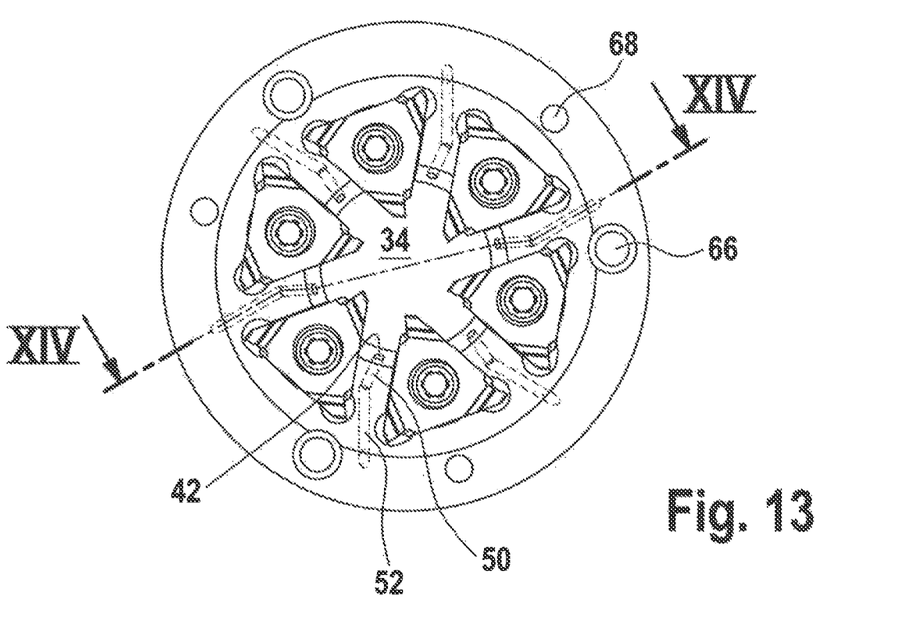
FIG. 13 shows a semi-transparent view from the front of the exemplary embodiment shown in FIG. 11.
Figure 14:
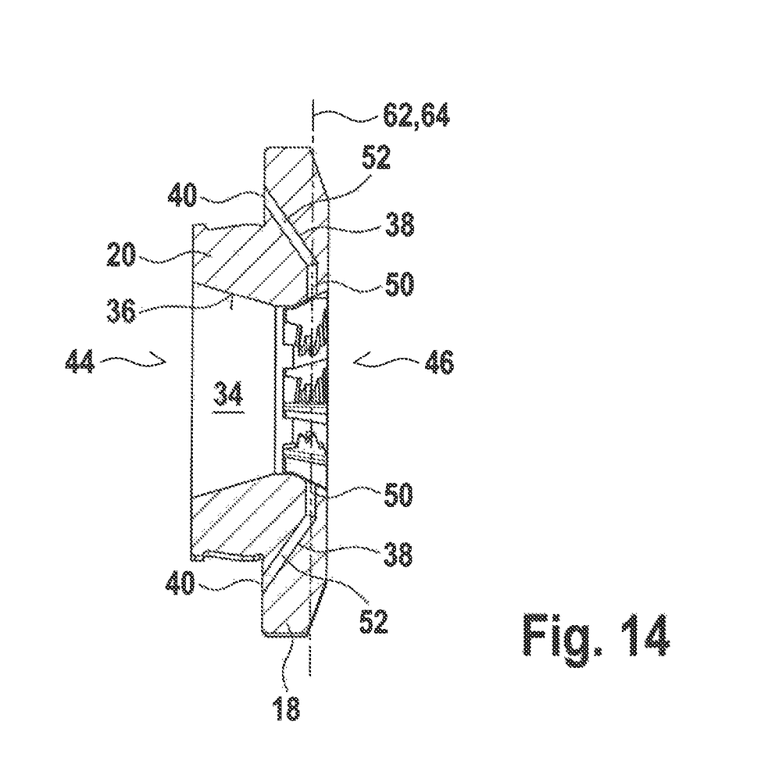
FIG. 14 shows a sectional view indicated in FIG. 13.
Figure 15:
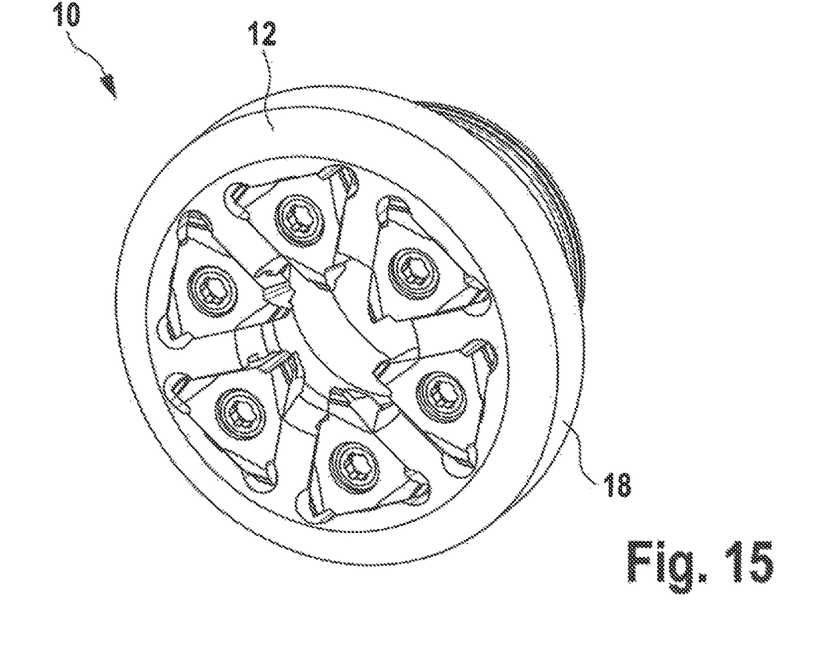
FIG. 15 shows a perspective view of a fourth exemplary embodiment of the whirling tool.
Figure 16:
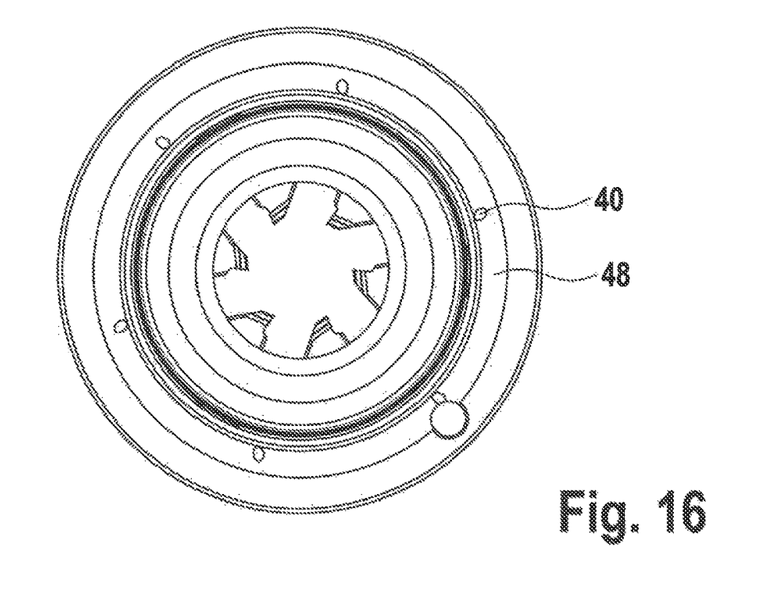
FIG. 16 shows a plan view from the rear of the exemplary embodiment shown in FIG. 15.
Figure 17:
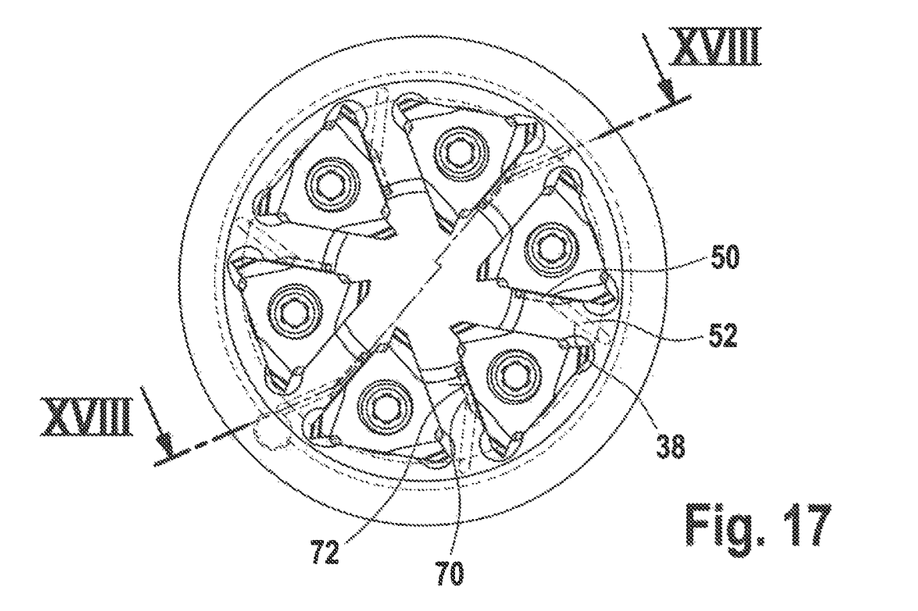
FIG. 17 shows a semi-transparent view from the front of the exemplary embodiment shown in FIG. 15.
Figure 18:
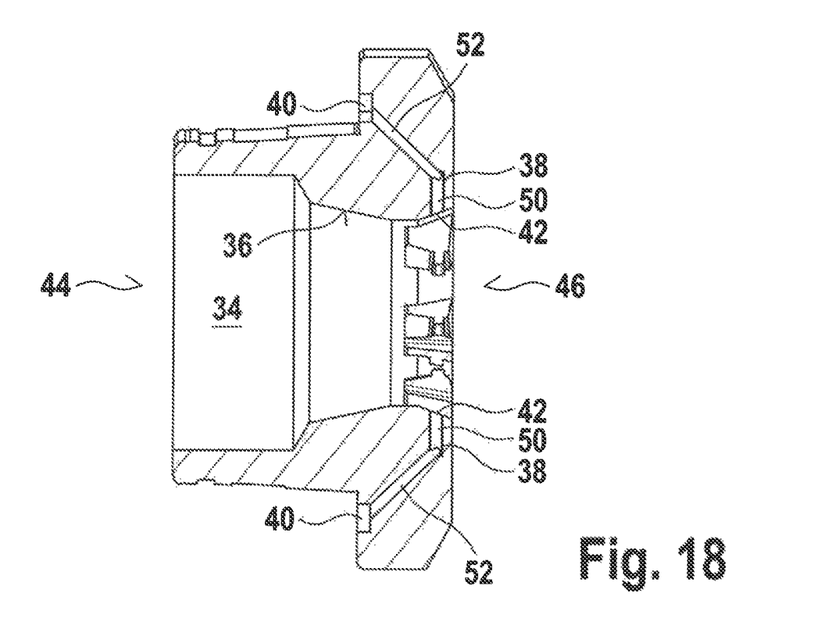
FIG. 18 shows a sectional view indicated in FIG. 17.

In the first exemplary embodiment, the coolant channels 38 have in each case two partial portions 50, 52 (see FIGS. 5 and 6). Both partial portions 50, 52 are designed as rectilinear (not curved) partial portions. The first partial portion 50 of each coolant channel 38 is adjacent to the outlet opening 42 of the respective coolant channel 38. The second partial portion 52 of each coolant channel 38 is adjacent to the inlet opening 40 of the respective coolant channel 38. Both partial portions 50, 52 transition directly into one another. Relative to a curved/bent coolant channel, an angled-back coolant channel 38, as shown here, of two rectilinear partial portions 50, 52, has the advantage that this coolant channel may be produced in a substantially simpler manner in terms of manufacturing technology.

The first partial portion 50 of each coolant channel 38 adjacent to the outlet opening 42 is preferably designed such that the coolant escaping from the outlet openings 42 is deflected as accurately as possible towards the cutting regions of the cutting inserts 14. This may be ensured, in particular, by the first rectilinear partial portion 50 of each coolant channel being oriented such that an imaginary line 58, which coincides with the central axis and/or axis of symmetry of the partial portion 50, intersects or is tangential to the cutting edge 15, a chip surface 54 or one of the clearance surfaces 56, in each case of one of the cutting inserts 14 (see FIG. 6).

In the exemplary embodiment shown in FIGS. 7-10, the inlet openings 40 of the individual coolant channels 38 are not arranged on the rear face 44 but on an envelope surface 60 of the cutting insert carrier 12 running in the circumferential direction. This envelope surface 60 preferably runs parallel to the central axis 26 of the cutting insert carrier 12 and thus also orthogonally to the radial direction of the cutting insert carrier 12. The subdivision of the individual coolant channels 38 into two rectilinear partial portions 50, 52, however, is similar to the first exemplary embodiment. Also in this case the first partial portion 50 is preferably oriented such that the coolant is deflected from the outlet openings 42 towards the cutting regions of the individual cutting inserts 14. Accordingly, the position of the outlet openings 42 is also selected in a similar manner to the first exemplary embodiment. The second partial portion 52 of each coolant channel 38 preferably runs in the radial direction of the cutting insert carrier.

In the third exemplary embodiment shown in FIGS. 11-14, the inlet openings 40 of the coolant channels 38 are arranged in turn on the rear face 44 of the cutting insert carrier 12 and/or on the rear face 44 of the top part 18. In contrast to the first exemplary embodiment shown in FIGS. 1-6, the inlet openings 40, however, are not arranged in a circumferential groove but separated from one another. The transfer of coolant between the tool machine and the whirling tool 10 is thus carried out separately for each coolant channel 38. The arrangement of the outlet openings 42 is once again similar to that according to the first two exemplary embodiments. The subdivision of the individual coolant channels 38 into two rectilinear partial portions 50, 52 is also similar to that described above with reference to the two first exemplary embodiments. The first partial portion 50 of each coolant channel 38 in this third exemplary embodiment, however, is oriented parallel to the front face 46 of the cutting insert carrier. In other words, the first partial portion 50 of each coolant channel 38 thus runs along an imaginary line 62 which is located in a plane 64 which is oriented orthogonally to the central axis 26 of the cutting insert carrier 12 (see FIG. 14).

Otherwise, the third exemplary embodiment substantially differs from the first two exemplary embodiments by structural differences, in particular relative to the shape of the top part 18 and the connecting flange 20. This is substantially because the whirling tool 10 according to the third exemplary embodiment is fastened slightly differently in the tool machine and/or the whirling unit. For example, a plurality of fastening and positioning bores 66, 68 are provided to this end in the top part 18 of the cutting insert carrier 12 (see FIG. 13).

In the fourth exemplary embodiment shown in FIGS. 15-18, the inlet openings 40 of the individual coolant channels 38 are arranged once again in a similar manner to that according to the first exemplary embodiment inside a circumferential groove 48 on the rear face 44 of the top part 18 of the cutting insert carrier 12. Each individual coolant channel 38 consists once again of two rectilinear partial portions 50, 52 which connect the inlet openings 40 to the respective outlet openings 42. The outlet openings 42 are also arranged in this case once again on the internal wall 36 of the through-opening 34. A difference from the exemplary embodiments described above is that in this exemplary embodiment the first partial portion 50 of each coolant channel 38 is designed in each case as a groove-shaped recess 70. These groove-shaped recesses 70 are in each case arranged inside and/or adjacent to one of the cutting insert receptacles 22. In this manner a coolant channel portion, which is open on one side and which is closed when the cutting inserts 14 are inserted, is produced since an external face 72 of each cutting insert 14 in each case forms a side wall of the first partial portion 50 of each coolant channel 38. The first partial portion 50 of each coolant channel 38 is thus able to run directly adjacent to the cutting inserts 14 and along these cutting inserts. In this manner, the coolant may pass even closer and in a more targeted manner into the cutting region of the individual cutting inserts 14.

The external faces 72 of the cutting inserts 14, which in each case form a side wall of the first partial portions 50 of the coolant channels 38, do not necessarily have to be a side surface of the cutting inserts 14, as shown in FIGS. 15-18. In principle, the first partial portion 50 may also be provided below the cutting inserts 14 and incorporated in the bearing surface 24 of the individual cutting insert receptacles 22.

Finally, it should also be mentioned that the outlet openings 42 of the coolant channels 38 do not necessarily have to be provided in the internal wall 36 of the through-opening 34.

What is claimed is:

1. A whirling tool, comprising:
   a plurality of cutting inserts, wherein each of the cutting inserts comprises at least one cutting edge;
   a cutting insert carrier that comprises a plurality of cutting insert receptacles that are each configured to receive one of the cutting inserts for releasably fastening therein, wherein the cutting insert receptacles are arranged so as to be distributed in a circumferential direction over the cutting insert carrier, wherein the cutting insert carrier comprises a through-opening which extends along a central axis of the cutting insert carrier, and through which the workpiece can be passed during the machining, wherein the cutting insert receptacles are arranged on a front face of the cutting insert carrier that runs transversely to the central axis, wherein each of the plurality of cutting insert receptacles comprises a supporting surface extending orthogonally to the central axis, wherein the supporting surfaces of the plurality of cutting insert receptacles are coplanar to one another, wherein each of the cutting inserts bears on the respective supporting surface in a planar manner, and wherein in a mounted state of the whirling tool the cutting inserts protrude into the through-opening; and
   a coolant channel which is arranged in the cutting insert carrier and which extends between an inlet opening and an outlet opening, wherein the outlet opening leads into the through-opening and/or is oriented towards the through-opening.

2. The whirling tool as claimed in claim 1, wherein the outlet opening is arranged between two of the plurality of cutting inserts.

3. The whirling tool as claimed in claim 1, wherein the through-opening is defined in a radial direction of the cutting insert carrier by an internal wall of the cutting insert carrier, wherein the outlet opening is arranged on the internal wall.

4. The whirling tool as claimed in claim 1, wherein the inlet opening is arranged on a rear face of the cutting insert carrier that opposes the front face and that runs transversely to the central axis.

5. The whirling tool as claimed in claim 4, wherein a groove running in the circumferential direction is arranged on the rear face of the cutting insert carrier, the inlet opening being arranged in said groove.

6. The whirling tool as claimed in claim 1, wherein the inlet opening is arranged on an envelope surface of the cutting insert carrier, said envelope surface running in the circumferential direction.

7. The whirling tool as claimed in claim 6, wherein the envelope surface runs orthogonally to a radial direction of the cutting insert carrier.

8. The whirling tool as claimed in claim 1, wherein at least a part of the coolant channel comprises a groove-shaped recess that is arranged in one of the cutting insert receptacles or adjacent to one of the cutting insert receptacles.

9. The whirling tool as claimed in claim 8, wherein an external face of one of the plurality of cutting inserts forms a part of the outlet opening.

10. The whirling tool as claimed in claim 1, wherein at least a part of the coolant channel comprises a bore that is arranged within the cutting insert carrier.

11. The whirling tool as claimed in claim 1, wherein the coolant channel comprises a bore with a first rectilinear portion that is adjacent to the outlet opening and runs along an imaginary line which intersects or is tangential to the cutting edge, a chip surface or a clearance surface of one of the cutting inserts.

12. The whirling tool as claimed in claim 1, wherein the coolant channel comprises a bore with a first rectilinear portion that is adjacent to the outlet opening and runs along an imaginary line which is located in a plane that is oriented orthogonally to the central axis of the cutting insert carrier.

13. The whirling tool as claimed in claim 1, wherein the coolant channel comprises a bore with a first rectilinear portion that is adjacent to the outlet opening and with a second rectilinear portion that is adjacent to the inlet opening, wherein the first rectilinear portion transitions directly into the second rectilinear portion, and wherein the first rectilinear portion and the second rectilinear portion enclose an angle unequal to 0°.

14. The whirling tool as claimed in claim 1, wherein the cutting insert carrier comprises (i) a flange that is configured to connect the cutting insert carrier to a machine tool, and (ii) a top part comprising the plurality of cutting insert receptacles and radially protruding from the flange, wherein the inlet opening, the outlet opening and the plurality of cutting insert receptacles are arranged on the top part.

15. The whirling tool as claimed in claim 1, wherein the whirling tool comprises a plurality of coolant channels, wherein the number of coolant channels corresponds to the number of cutting inserts and each of the coolant channels is arranged in the cutting insert carrier and extends between one respective inlet opening and one respective outlet opening, wherein each one of the outlet openings is arranged between two of the plurality of cutting inserts, respectively.

16. The whirling tool as claimed in claim 1, wherein each of the plurality of cutting insert receptacles comprises at least two bearing surfaces that are arranged transversely to the supporting surface of the respective cutting insert receptacle, the at least two bearing surfaces of each of the plurality of cutting insert receptacles are arranged at an acute angle to one another and orthogonally to the supporting surface of the respective cutting insert receptacle.

17. A whirling tool, comprising:
a plurality of cutting inserts, wherein each of the cutting inserts comprises at least one cutting edge;
a cutting insert carrier that comprises a plurality of cutting insert receptacles that are each configured to receive one of the cutting inserts for releasably fastening therein, wherein the cutting insert receptacles are arranged so as to be distributed in a circumferential direction over the cutting insert carrier, wherein the cutting insert carrier comprises a through-opening which extends along a central axis of the cutting insert carrier, and through which the workpiece can be passed during the machining, wherein the cutting insert receptacles are arranged on a front face of the cutting insert carrier that runs transversely to the central axis, wherein each of the plurality of cutting insert receptacles comprises a supporting surface extending orthogonally to the central axis and at least two bearing surfaces that are arranged transversely to the supporting surface of the respective cutting insert receptacle, the at least two bearing surfaces of each of the plurality of cutting insert receptacles are arranged at an acute angle to one another and orthogonally to the supporting surface of the respective cutting insert receptacle, wherein each of the cutting inserts bears on the respective supporting surface in a planar manner, and wherein in a mounted state of the whirling tool the cutting inserts protrude into the through-opening; and
a coolant channel which is arranged in the cutting insert carrier and which extends between an inlet opening and an outlet opening, wherein the outlet opening leads into the through-opening and/or is oriented towards the through-opening.

18. The whirling tool as claimed in claim 17, wherein the outlet opening is arranged between two of the plurality of cutting inserts.

19. The whirling tool as claimed in claim 17, wherein the through-opening is defined in a radial direction of the cutting insert carrier by an internal wall of the cutting insert carrier, wherein the outlet opening is arranged on the internal wall.

20. The whirling tool as claimed in claim 17, wherein the inlet opening is arranged on a rear face of the cutting insert carrier that opposes the front face and that runs transversely to the central axis.

21. The whirling tool as claimed in claim 17, wherein the coolant channel comprises a bore with a first rectilinear portion that is adjacent to the outlet opening and with a second rectilinear portion that is adjacent to the inlet opening, wherein the first rectilinear portion transitions directly into the second rectilinear portion, and wherein the first rectilinear portion and the second rectilinear portion enclose an angle unequal to 0°.

22. The whirling tool as claimed in claim 17, wherein the cutting insert carrier comprises (i) a flange that is configured to connect the cutting insert carrier to a machine tool, and (ii) a top part comprising the plurality of cutting insert receptacles and radially protruding from the flange, wherein the inlet opening, the outlet opening and the plurality of cutting insert receptacles are arranged on the top part.

23. The whirling tool as claimed in claim 17, wherein the whirling tool comprises a plurality of coolant channels, wherein the number of coolant channels corresponds to the number of cutting inserts and each of the coolant channels is arranged in the cutting insert carrier and extends between one respective inlet opening and one respective outlet opening, wherein each one of the outlet openings is arranged between two of the plurality of cutting inserts, respectively.

24. The whirling tool as claimed in claim 17, wherein the supporting surfaces of the plurality of cutting insert receptacles are coplanar to one another and extend orthogonally to the central axis.

25. A whirling tool, comprising:
a plurality of cutting inserts, wherein each of the cutting inserts comprises at least one cutting edge;
a cutting insert carrier that comprises a plurality of cutting insert receptacles that are each configured to receive one of the cutting inserts for releasably fastening therein, wherein the cutting insert receptacles are arranged so as to be distributed in a circumferential direction over the cutting insert carrier, wherein the cutting insert carrier comprises a through-opening which extends along a central axis of the cutting insert carrier, and through which the workpiece can be passed during the machining, wherein the cutting insert receptacles are arranged on a front face of the cutting insert carrier that runs transversely to the central axis, wherein each cutting insert receptacle comprises a supporting surface extending orthogonally to the central axis, wherein each of the cutting inserts bears on the respective supporting surface in a planar manner, and wherein in a mounted state of the whirling tool the cutting inserts protrude into the through-opening; and a coolant channel which is arranged in the cutting insert carrier and which extends between an inlet opening and an outlet opening, wherein the outlet opening leads into the through-opening and/or is oriented towards the through-opening;

wherein the cutting insert carrier comprises (i) a flange that is configured to connect the cutting insert carrier to a machine tool, and (ii) a top part comprising the plurality of cutting insert receptacles and radially protruding from the flange, wherein the inlet opening, the outlet opening and the plurality of cutting insert receptacles are arranged on the top part.

26. The whirling tool as claimed in claim 25, wherein the outlet opening is arranged between two of the plurality of cutting inserts.

27. The whirling tool as claimed in claim 25, wherein the through-opening is defined in a radial direction of the cutting insert carrier by an internal wall of the cutting insert carrier, wherein the outlet opening is arranged on the internal wall.

28. The whirling tool as claimed in claim 25, wherein the inlet opening is arranged on a rear face of the cutting insert carrier that opposes the front face and that runs transversely to the central axis.

29. The whirling tool as claimed in claim 25, wherein the coolant channel comprises a bore with a first rectilinear portion that is adjacent to the outlet opening and with a second rectilinear portion that is adjacent to the inlet opening, wherein the first rectilinear portion transitions directly into the second rectilinear portion, and wherein the first rectilinear portion and the second rectilinear portion enclose an angle unequal to 0°.

30. The whirling tool as claimed in claim 25, wherein the whirling tool comprises a plurality of coolant channels, wherein the number of coolant channels corresponds to the number of cutting inserts and each of the coolant channels is arranged in the cutting insert carrier and extends between one respective inlet opening and one respective outlet opening, wherein each one of the outlet openings is arranged between two of the plurality of cutting inserts, respectively.

31. The whirling tool as claimed in claim 25, wherein the supporting surfaces of the plurality of cutting insert receptacles are coplanar to one another and extend orthogonally to the central axis.

32. The whirling tool as claimed in claim 25, wherein each of the plurality of cutting insert receptacles comprises at least two bearing surfaces that are arranged transversely to the supporting surface of the respective cutting insert receptacle, the at least two bearing surfaces of each of the plurality of cutting insert receptacles are arranged at an acute angle to one another and orthogonally to the supporting surface of the respective cutting insert receptacle.

* * * * *